(12) United States Patent
Yazaki et al.

(10) Patent No.: US 11,584,496 B2
(45) Date of Patent: Feb. 21, 2023

(54) NEUTRAL ADJUSTING MECHANISM OF OUTBOARD MOTOR

(71) Applicant: HONDA MOTOR CO., LTD., Tokyo (JP)

(72) Inventors: Makoto Yazaki, Wako (JP); Yusaku Komaki, Kawasaki (JP)

(73) Assignee: HONDA MOTOR CO., LTD., Tokyo (JP)

( * ) Notice: Subject to any disclaimer, the term of this patent is extended or adjusted under 35 U.S.C. 154(b) by 159 days.

(21) Appl. No.: 17/207,790

(22) Filed: Mar. 22, 2021

(65) Prior Publication Data

US 2021/0300514 A1 Sep. 30, 2021

(30) Foreign Application Priority Data

Mar. 27, 2020 (JP) ............................. JP2020-057174

(51) Int. Cl.
*B63H 20/08* (2006.01)
*B63H 21/21* (2006.01)

(52) U.S. Cl.
CPC ....... *B63H 20/08* (2013.01); *B63H 2021/216* (2013.01)

(58) Field of Classification Search
CPC ..................... B63H 20/08; B63H 2021/216
See application file for complete search history.

(56) References Cited

U.S. PATENT DOCUMENTS 9,823,681 B2 * 11/2017 Valle .................... B62M 25/04

FOREIGN PATENT DOCUMENTS

JP 2006-062478 3/2006

* cited by examiner

*Primary Examiner* — Stephen P Avila
(74) *Attorney, Agent, or Firm* — Amin, Turocy & Watson, LLP (57) ABSTRACT

A shift mechanism configuring an outboard motor comprises: an electric actuator that linearly moves a movable rod; and a shift shaft portion that switches from neutral to forward or reverse based on displacement of said movable rod. Moreover, a neutral adjusting mechanism enabling a neutral position of the shift mechanism to be adjusted is provided facing the shift shaft portion, by a separate body. The neutral adjusting mechanism, which comprises first and second adjusting arms that are supported in a freely rotating manner with respect to a frame and that have been biased in contrary directions to each other by elastic springing force of a coil spring, is provided in a manner that an adjusting screw mounted in the first adjusting arm capable of abutting on a shift arm always abuts on a contacting wall of the second adjusting arm capable of contacting a switch sensor.

8 Claims, 9 Drawing Sheets

NEUTRAL ADJUSTING MECHANISM OF OUTBOARD MOTOR

CROSS-REFERENCE TO RELATED APPLICATION

This application is based upon and claims the benefit of priority from Japanese Patent Application No. 2020-057174 filed on Mar. 27, 2020, the contents of which are incorporated herein by reference.

BACKGROUND OF THE INVENTION

Field of the Invention

The present invention relates to a neutral adjusting mechanism of an outboard motor that, in an outboard motor comprising a shift mechanism performing gear shifting of a transmission by an electric actuator, enables a neutral position of the shift mechanism to be adjusted.

Description of the Related Art

The applicant of the present application has proposed in Japanese Laid-Open Patent Publication No. 2006-062478 an outboard motor comprising a shift mechanism in which an electric actuator is directly coupled to a shift rod (an operating shaft), and gear shifting of a transmission is performed via the shift rod under drive action of said electric actuator. Such a shift mechanism of an outboard motor enables more minute control regarding shift switching and throttle control, coupling of these switching and control, and so on, compared to in a conventional cable system.

On the other hand, in the above-mentioned kind of shift mechanism, unlike in the cable system enabling physical experience by a ship operator, a clutch is varied by an electric signal, hence it is important for a shift position to be accurately grasped, and, in particular, it is required to accurately confirm that the shift position is in a neutral position at a time of power-up of the outboard motor.

Moreover, although a detection switch for detecting the neutral position of the shift mechanism is installed, effects of component error or assembly variation cannot be ignored, and there are demands wanting position adjustment of neutral to be easily and certainly performed at a time of factory shipment, a time of maintenance, and so on, of the outboard motor.

SUMMARY OF THE INVENTION

A general object of the present invention is to provide a neutral adjusting mechanism of an outboard motor that enables variation of a neutral position in a shift mechanism to be easily and certainly adjusted in a variety of outboard motors.

An aspect of the present invention comprises:
a shift mechanism having an electric actuator and a switching means, the electric actuator linearly moving a movable portion, and the switching means switching from neutral to forward or reverse based on displacement of said movable portion; and
a position adjusting mechanism enabling a neutral position of the shift mechanism to be adjusted,
the shift mechanism and the position adjusting mechanism being configured by separate bodies.

Due to the present invention, a shift mechanism in an outboard motor has an electric actuator that linearly moves a movable body and a switching means that switches from neutral to forward or reverse based on displacement of the movable portion, and a position adjusting mechanism enabling a neutral position of the shift mechanism to be adjusted is configured by a separate body from the shift mechanism. Hence, even an outboard motor not provided with the position adjusting mechanism can be easily retrofitted with the position adjusting mechanism to have variation of the neutral position in the shift mechanism easily and certainly adjusted.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
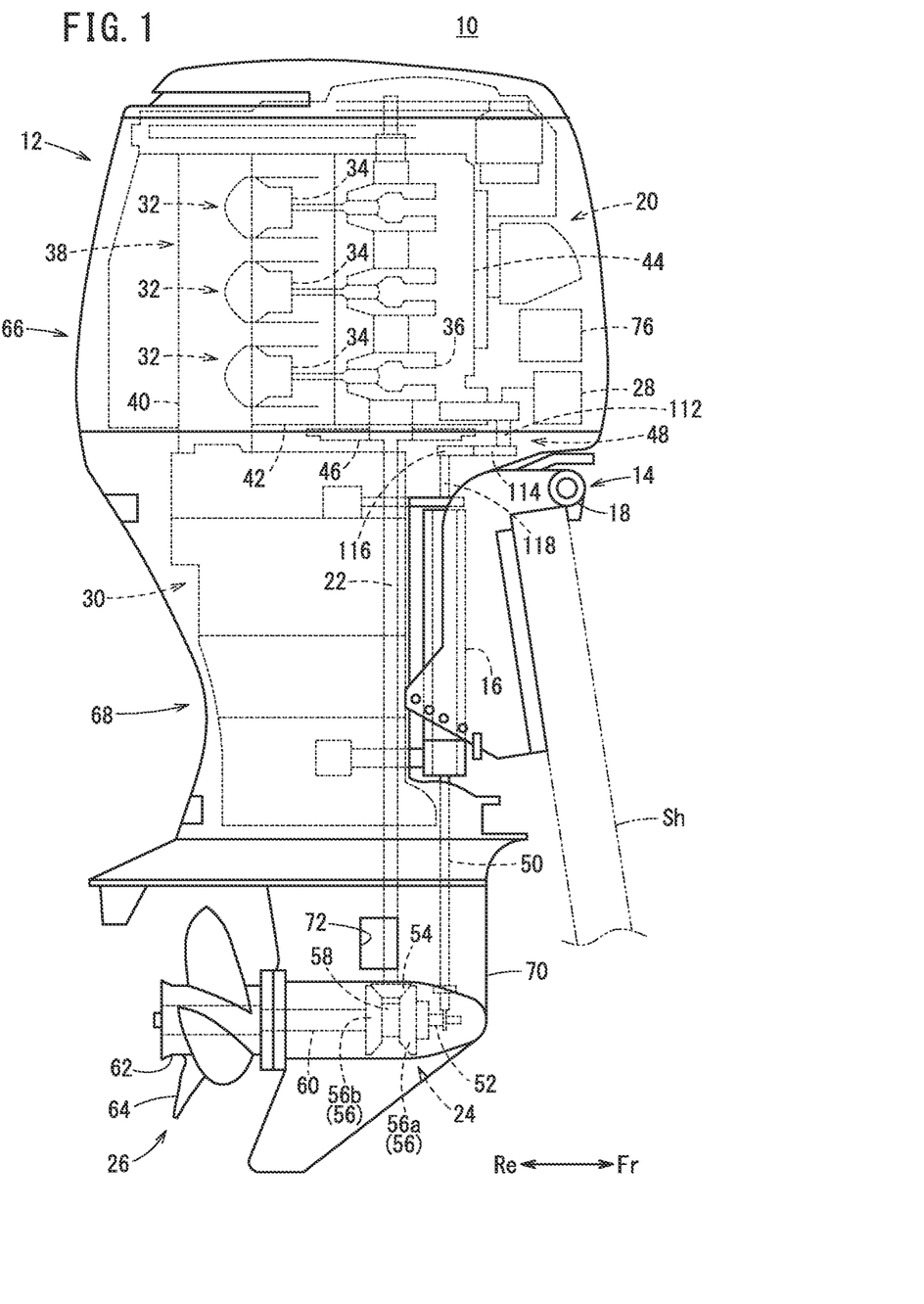
FIG. 1 is an overall side view of an outboard motor according to an embodiment of the present invention.

This outboard motor 10, which is mounted on a ship body Sh as a power source of the likes of a small ship, for example, and, as shown in FIG. 1, comprises: a cover 12 housing each of configurations thereby covering the configurations; and a mounting mechanism 14 fixed to the ship body Sh forward of said cover 12, is driven under operation of an unillustrated ship operator to propel the ship body Sh. FIG. 1 shows the above-mentioned outboard motor 10 that has been installed with a neutral adjusting mechanism 120.

The mounting mechanism 14 enables the outboard motor 10 to swing to left and right around a swivel shaft 16 in planar view seen from above, and enables the cover 12 to revolve clockwise or counterclockwise around a tilt shaft 18 in the side view shown in FIG. 1. Moreover, the outboard motor 10 has its propeller (fins 64) positioned below a water surface in a state where an up-down direction of the cover 12 extends in substantially a vertical direction.

An inside of the cover 12 houses an engine 20, a drive shaft 22, a transmission mechanism 24, a propeller mechanism 26, and a control device 28. Moreover, in a lower portion of the engine 20, the outboard motor 10 comprises an unillustrated exhaust system allowing exhaust gas of the engine 20 to flow, and comprises a cooling structure 30 that cools the engine 20 and the exhaust gas.

As the engine 20, there is applied a multi-cylinder engine (for example, a V type engine) comprising a plurality of cylinders 32 along an up-down direction (a vertical direction) of the outboard motor 10. Moreover, the engine 20 is disposed in such a manner that axis lines of each of the cylinders 32 will be sideways-facing (substantially horizontal) and a crank shaft 36 coupled to connecting rods 34 of each of the cylinders 32 will extend in the up-down direction.

In addition, the engine 20 has an engine main body 38 housing the connecting rods 34, the crank shaft 36, and so on, and said engine main body 38, which is a structural portion not including an auxiliary device such as an intake system or the exhaust system of the engine 20, is configured from a cylinder head 40, a cylinder block 42, and a crank case 44. Moreover, the cylinder head 40 and the cylinder block 42 are provided with an unillustrated cooling water jacket that cools the engine 20.

Furthermore, a lower end portion of the crank shaft 36 in the engine 20 has coupled thereto a flywheel 46, and said flywheel 46 is disposed downwardly with respect to the cylinder block 42 and the crank case 44, and has coupled to its center the drive shaft 22. Moreover, the drive shaft 22, which extends in the up-down direction along an inside of the cover 12 to freely rotate around its own axis, has its lower end housed in the transmission mechanism 24.

The transmission mechanism 24, to which rotational movement is transmitted via an operating shaft 50 from a shift mechanism 48 provided in a vicinity of the engine 20, performs gear shifting (shift switching) of rotational output of the engine 20 based on rotation of said operating shaft 50. Note that "gear shifting" in the present specification is an expression that includes switching of an advancing direction (forward, neutral, reverse) of the ship body Sh.

In this transmission mechanism 24, a shift slider 52 is advanced/retracted along an axial direction of the propeller mechanism 26 (a propeller shaft 60) based on rotation of the operating shaft 50. As a result, the shift slider 52 moves a dog clutch 58 between a pair of driven bevel gears 56 (a forward-movement driven bevel gear 56a and a reverse-movement driven bevel gear 56b) that mesh with a drive bevel gear 54 coupled to the drive shaft 22.

Moreover, by a tooth surface of the moved dog clutch 58 meshing with either one of an inner side tooth surface of the forward-movement driven bevel gear 56a or an inner side tooth surface of the reverse-movement driven bevel gear 56b, a driving force of the engine 20 is transmitted to the propeller mechanism 26 via the dog clutch 58 and the later-described propeller shaft 60.

The propeller mechanism 26 has: the propeller shaft 60 which is tubular having the shift slider 52 inserted therein; a tubular body 62 coupled to an outer side in a radial direction of said propeller shaft 60; and a plurality of the fins 64 coupled to an outer peripheral surface of said tubular body 62, and, by rotating each of the fins 64 clockwise or counterclockwise about the propeller shaft 60 rotating via the transmission mechanism 24, advances or reverses the ship body Sh.

Moreover, the cover 12 of the outboard motor 10 has: an upper cover 66 covering the engine 20 positioned in an upper portion of the outboard motor 10; and a lower cover 68 covering further to a lower portion side than the engine 20, of the outboard motor 10, wherein the upper cover 66 and the lower cover 68 are fixed to a mounting frame (not illustrated) in which the engine 20 is mounted, for example.

The above-mentioned engine 20 and cooling structure 30 adopt a water-cooling system in which water such as sea water or fresh water that has been taken in from a water intake port 72 of a gear case 70 is supplied to the engine 20, thereby enabling the engine 20 to be cooled. Moreover, the water that has been used in cooling of the engine 20, and so on, is mixed with exhaust gas to be discharged to outside of the cover 12 through a through-hole in the tubular body 62.

Figure 2:
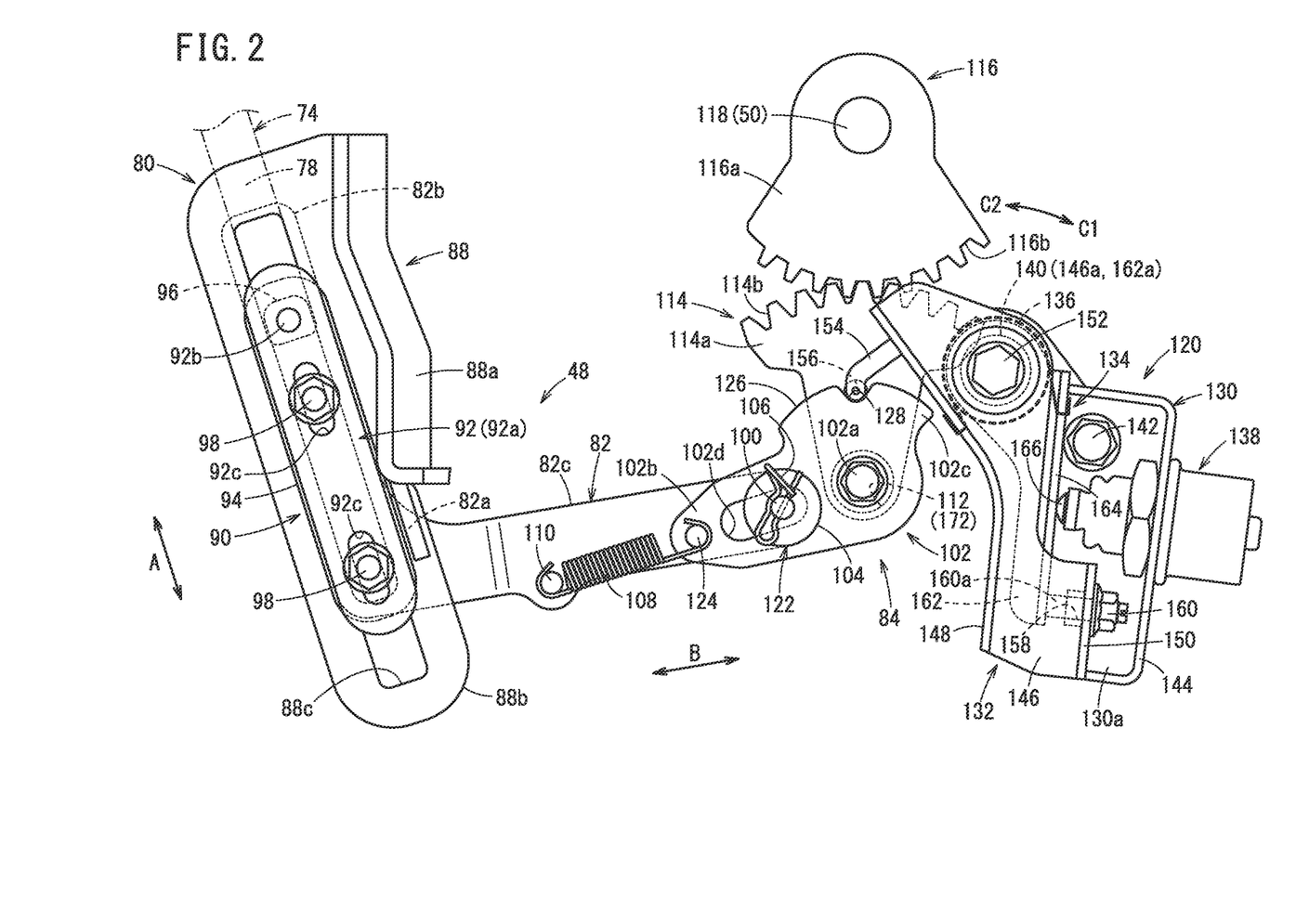
FIG. 2 is an enlarged plan view showing a shift mechanism configuring the outboard motor of FIG. 1.

Next, the shift mechanism 48 of the outboard motor 10 according to the present embodiment will be specifically described. As shown in FIGS. 1 and 2, the shift mechanism 48 has its main mechanism portion fixed to a side and front of the engine 20 of the outboard motor 10, and has an electric actuator 74 (hereafter, simply called actuator 74) that, upon receiving an operating signal of an operating unit (not illustrated) due to the unillustrated ship operator, rotates the operating shaft 50.

That is, the control device 28 supplies electric power to the actuator 74 from a battery 76 (refer to FIG. 1) based on the operating signal such as an electrical signal or a wireless signal, and causes a movable rod 78 of the actuator 74 shown in FIG. 2 to linearly move. Moreover, the shift mechanism 48 converts linear movement of the actuator 74 into rotational movement to rotate the operating shaft 50.

Figure 3:
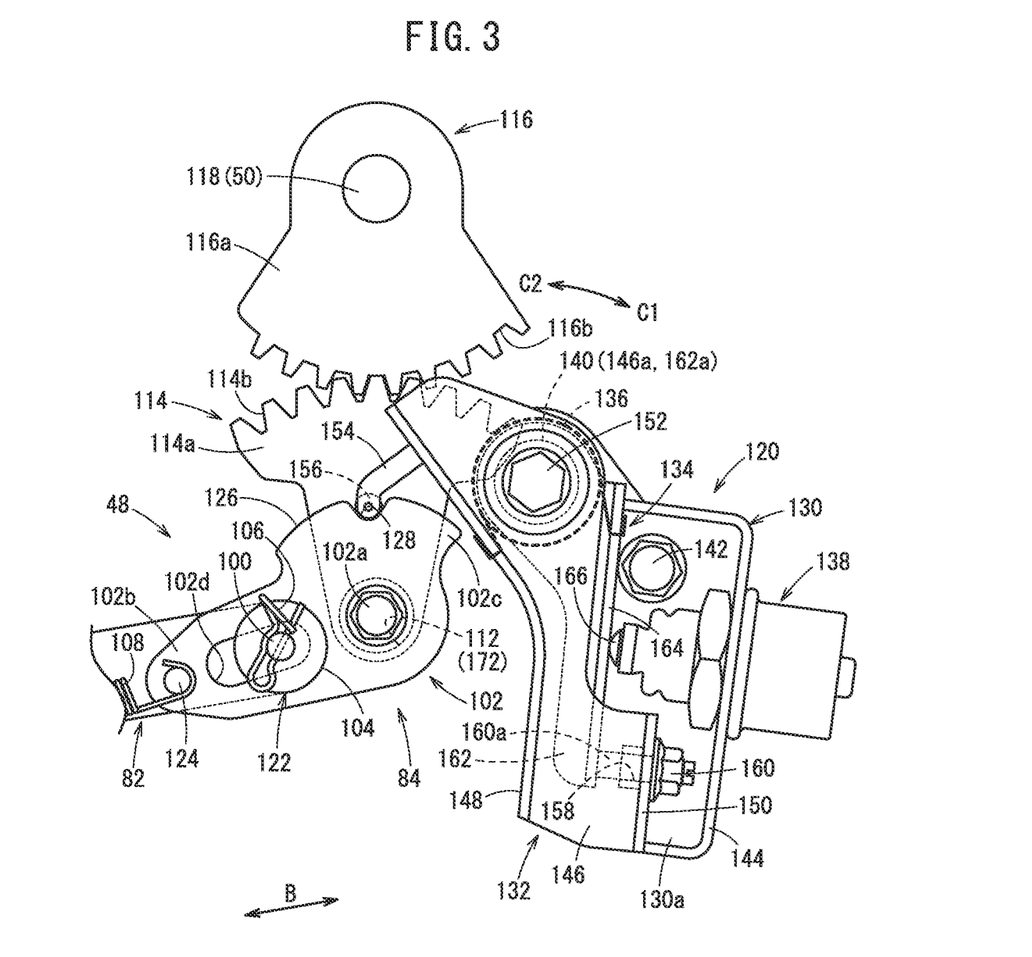
FIG. 3 is an enlarged plan view of a vicinity of a neutral adjusting mechanism in the shift mechanism of FIG. 2.

As shown in FIGS. 2 and 3, this shift mechanism 48 includes: the actuator 74; a guide structure 80 that guides linear movement of the movable rod 78 of said actuator 74; and a link rod 82 and a shift shaft portion (a switching means) 84 that convert said linear movement into rotational movement, wherein the actuator 74 comprises a motor (not illustrated) that rotationally drives under energization action.

The movable rod 78 of the actuator 74, to which rotation of the unillustrated motor is transmitted after being converted into linear movement, is guided in a freely linear manner by the guide structure 80 connected to its tip end. The guide structure 80 has: a guide body 88 which is fixed to the engine main body 38; and a sliding body 90 that couples between the movable rod 78 and the link rod 82 and is guided by the guide body 88.

The guide body 88 has: a fixed plate portion 88a which is fixed to the engine main body 38 (refer to FIG. 1); and a guide plate portion 88b that is continuous with a lower portion of said fixed plate portion 88a and extends in a horizontal direction, wherein the guide plate portion 88b is provided with a guide opening portion 88c that guides the sliding body 90 along a sliding direction. Moreover, the guide plate portion 88b and the guide opening portion 88c extend so as to lie along an extension direction of the movable rod 78 of the actuator 74.

The sliding body 90, which is configured by a plurality of members (the link rod 82, a coupling member 92, a pivot plate 94, and a shift pivot 96) being fastened by two connecting bolts 98, is provided in a freely sliding manner to the guide plate portion 88b via the guide opening portion 88c.

The coupling member 92 has: a long plate 92a having a certain thickness; and a coupling bar 92b that projects upwardly from a base end portion of said long plate 92a, wherein further forward than a coupling place of the coupling bar 92b in the long plate 92a, there are provided two long holes 92c in which the two connecting bolts 98 are respectively inserted. The long holes 92c, which extend along a longitudinal direction of the long plate 92a, are provided in a manner enabling positions of the other members coupled by the connecting bolts 98 (the link rod 82, the pivot plate 94, and the shift pivot 96) to be adjusted.

The coupling bar 92b has its lower end fixedly inserted in a hole portion (not illustrated) of the long plate 92a and its upper end axially supported in a freely revolving manner with respect to the movable rod 78 of the actuator 74, resulting in the movable rod 78 and the coupling member 92 being connected in a relatively rotatable manner, and the sliding body 90 linearly moving based on movement of the movable rod 78.

The pivot plate 94 is fixed to an opposite side to a projecting direction of the coupling bar 92b in the coupling member 92. The shift pivot 96 is disposed between the link rod 82 and the pivot plate 94, and configures a portion disposed in the guide opening portion 88c of the guide body 88 and sliding along the guide body 88.

The link rod 82, which is formed in substantially a V shape in the planar view (upper surface view) shown in FIGS. 2 and 3, has: a target-of-fixing portion 82b which extends in a first direction (an arrows A direction) via a base point 82a and is fixed to the sliding body 90 of the guide structure 80; and an extending-out portion 82c which is bent with respect to said target-of-fixing portion 82b to extend in a transverse direction to the guide structure 80 being a second direction (an arrows B direction). That is, the target-of-fixing portion 82b and the extending-out portion 82c are formed inclined at a certain angle. Moreover, the target-of-fixing portion 82b is fixed extending in the same direction as the sliding body 90 of the guide structure 80.

On the other hand, an end portion lying along the second direction (the arrows B direction) of the extending-out portion 82c has coupled thereto a link pin 100, and has connected thereto via said link pin 100 a shift arm (a shift shaft) 102 of the shift shaft portion 84. Specifically, an upper portion of the link pin 100 is fitted with a washer 104, and is axially supported by a fixing pin 106 being inserted in a hole portion thereof formed penetrating in a radial direction. Moreover, mid-way along an extension direction of the extending-out portion 82c, there is provided a first attaching projection 110 to which one end of a spring 108 is attached.

The shift shaft portion 84 revolves based on displacement of the above-mentioned link rod 82, is configured enabling its rotational movement to be transmitted to the operating shaft 50, and, as shown in FIGS. 2 to 5, is configured from: the shift arm 102; a first shift shaft (a shift shaft) 112 and a first gear 114 that are coupled to said shift arm 102; a second gear 116 which is meshed with said first gear 114; a second shift shaft 118 which is coupled to said second gear 116; and the neutral adjusting mechanism (a position adjusting mechanism) 120 which can detect and adjust a neutral position of the shift mechanism 48.

The shift arm 102, which is formed in a shape of a plate of constant thickness, has: a rotational center portion 102a to which the first shift shaft 112 is coupled; a link extension portion 102b that extends in a direction that the link rod 82 is disposed (the second direction of the extending-out portion 82c, the arrows B direction) with reference to said rotational center portion 102a; and a neutral-dedicated cam portion 102c that extends out in a different direction from said link extension portion 102b.

The link extension portion 102b has a link-dedicated hole portion 102d penetrating upper and lower surfaces of the shift arm 102, and is formed in a shape of a long hole long along an extension direction of the link extension portion 102b. Moreover, the link-dedicated hole portion 102d has the link pin 100 inserted in a movable manner therein. That is, due to a link connecting structure 122 including the link-dedicated hole portion 102d and the link pin 100, linear movement along the second direction (the arrows B direction) of the link rod 82 is converted into rotational movement of the shift arm 102.

In the case that, for example, the shift mechanism 48 shown in FIGS. 2 and 3 is in the neutral position, the link pin 100 is positioned closer to a base end portion of the link-dedicated hole portion 102d (the rotational center portion 102a). On the other hand, when the extending-out portion 82c of the link rod 82 moves frontwards or rearwards, the link pin 100 moves toward a tip portion (an extending-out end portion) side along an inside of the link-dedicated hole portion 102d. The shift arm 102 rotates clockwise or counterclockwise about the rotational center portion 102a due to this movement.

As shown in FIGS. 2 to 5, an end portion of the link extension portion 102b is provided with a second attaching projection 124 to which the other end of the spring 108 is coupled, and this spring 108, which is provided between the second attaching projection 124 and the first attaching projection 110, applies an appropriate tensile force between the link rod 82 and the shift arm 102.

The neutral-dedicated cam portion 102c is formed in substantially a circular arc shape separated by a certain radius to an outer side in a radial direction from the rotational center portion 102a, its outer edge 126 configures a portion contacted by a contactor (an engaging portion) 154 of the neutral adjusting mechanism 120, and said outer edge 126 is provided with a recess (an engaging recess) 128 entered by the contactor 154. Moreover, the outer edge 126 is formed with the same diameter centered on the rotational center portion 102a.

The first shift shaft 112, which is connected to a lower side of the shift arm 102, has the first gear 114 connected to its lower end. The first gear 114 has a fan-like portion 114a which is coupled to a lower end portion of the first shift shaft 112 and whose shape broadens toward an outer side in a radial direction, and, along an outer periphery of the fan-like portion 114a which is formed in a circular arc shape, the first gear 114 has a plurality of first tooth portions 114b. Moreover, the first gear 114 integrally rotates clockwise or counterclockwise with rotation of the first shift shaft 112. That is, the shift arm 102 and the first gear 114 integrally rotate via the first shift shaft 112.

The second gear 116, which is formed in substantially the same shape as the first gear 114, comprises a fan-like portion 116a which has coupled thereto an upper end portion of the second shift shaft 118 and whose shape broadens toward an outer side in a radial direction, and, on an outer periphery of the fan-like portion 116a which is formed in a circular arc shape, there are formed second tooth portions 116b that mesh with the first tooth portions 114b. That is, due to meshing of the first tooth portions 114b and the second tooth portions 116b, rotational movement of the first gear 114 is transmitted to the second gear 116, and the second gear 116 rotates the second shift shaft 118 clockwise or counterclockwise.

Moreover, a lower end of the second shift shaft 118 has the operating shaft 50 integrally coupled coaxially thereto (refer to FIG. 1), and by said second shift shaft 118 rotating, the operating shaft 50 rotates, and rotational force of the engine 20 is transmitted to the propeller mechanism 26 via the shift mechanism 48 and the transmission mechanism 24.

The neutral adjusting mechanism 120, which is disposed on an outer peripheral side of the shift arm 102 configuring the shift shaft portion 84, includes, for example: a frame 130 which is fixed to the engine main body 38; a first and a second adjusting arm 132, 134 that are supported in a freely revolving manner with respect to said frame 130; a coil spring (an elastic member) 136 which is fitted interposingly between the first adjusting arm (a first arm) 132 and the second adjusting arm (a second arm) 134; and a switch sensor 138 which is fixed to the frame 130 and is capable of contacting a contacting wall (a position adjusting portion, a contacting portion, a switching portion) 164 of the second adjusting arm 134.

This neutral adjusting mechanism 120, which is unitized by having the first and second adjusting arms 132, 134, the coil spring 136, and the switch sensor 138 provided to the frame 130, is configured able to be retrofitted to a variety of outboard motors 10 by a later-mentioned mounting bolt 142.

The frame 130 is disposed substantially orthogonally to an extension direction of the extending-out portion 82c of the link rod 82 (the second direction, the arrows B direction) in planar view looking from an axial direction of the first shift shaft 112. Moreover, the frame 130 has provided projecting upwardly on its bottom wall 130a a support shaft 140 that supports in a freely rotating manner the first and second adjusting arms 132, 134, and the frame 130 is fixed by the bottom wall 130a being fastened to the unillustrated engine main body 38 by the mounting bolt 142.

Moreover, the frame 130 comprises a holding wall 144 that stands uprightly substantially orthogonally to the bottom wall 130a, and said holding wall 144, which faces the shift arm 102, extends with a planar shape in an up-down direction and has mounted at substantially its center the later-mentioned switch sensor 138. Note that in the frame 130, a region fastened by the mounting bolt 142 is disposed close to the holding wall 144, whereas the support shaft 140 is provided on a shift arm 102 side of this fastened region, that is, at a position separated from the holding wall 144.

The first adjusting arm 132, which is formed by press-forming a plate material, for example, and is provided separated by a certain interval parallel to and upwards of the bottom wall 130a of the frame 130, comprises: a first base portion 146 which is substantially parallel to the bottom wall 130a; a first rib 148 which is bent substantially orthogonally upwardly with respect to said first base portion 146; and a second rib 150 which is bent to a lower side, that is, an opposite side to the first rib 148 with respect to the first base portion 146.

Moreover, the first adjusting arm 132, which has its first rib 148 disposed so as to be on a shift arm 102 side and its second rib 150 disposed so as to be on a holding wall 144 side, is positioned in an axial direction (the up-down direction) by having its one end side along an extension direction of the first base portion 146 inserted over the support shaft 140 via a through-hole (a first connecting portion) 146a, and is fixed in a freely revolving manner by a fastening bolt 152, along with the later-mentioned second adjusting arm 134.

Moreover, the contactor 154 projecting toward the shift arm 102 side is provided on one end side of the first base portion 146 at a position on an outer side of the first rib 148. The contactor 154, which projects substantially orthogonally to the first rib 148, has its tip bent by a certain angle with respect to a projecting direction and provided with a roller 156 in such a manner that the roller 156 freely rotates. This roller 156 is provided in such a manner that its outer peripheral surface projects to a slight extent from the tip of the contactor 154.

Moreover, the tip of the contactor 154 is disposed able to always contact the outer edge 126 or the recess 128 of the neutral-dedicated cam portion 102c of the shift arm 102 via the roller 156. Note that in the planar view of the shift mechanism 48 shown in FIG. 2, the contactor 154 is formed with a size enabling it to move along an inside of the recess 128.

On the other hand, the other end along the extension direction of the first base portion 146 is disposed more separated from the shift arm 102 than its one end side is, and an adjusting screw (a position adjusting portion) 160 is screwed in a freely advancing/retracting manner into a screw hole 158 provided in the second rib 150. The screw hole 158, which penetrates orthogonally to an extension direction of the second rib 150, is provided in such a manner that the adjusting screw 160 is screwed into the screw hole 158 from an outer side of the second rib 150 and its tip 160a abuts on a contacting wall 164 of the later-mentioned second adjusting arm 134.

That is, the adjusting screw 160, which is disposed with its tip 160a oriented to a shift shaft portion 84 side, is provided freely moving in an axial direction along the screw hole 158 by being spirally turned with respect to the first adjusting arm 132.

The second adjusting arm 134 is formed by press-forming a plate material, for example, and is provided parallel to the bottom wall 130a of the frame 130 and between the first adjusting arm 132 and the bottom wall 130a, similarly to the first adjusting arm 132. Note that the second adjusting arm 134 is disposed separated by a certain interval from the frame 130 and the first adjusting arm 132.

This second adjusting arm 134 has: a second base portion 162 which is formed substantially parallelly to the bottom wall 130a of the frame 130; and the contacting wall 164 which is bent substantially orthogonally upwardly with respect to said second base portion 162, wherein one end lying along an extension direction of the second base portion 162 is inserted over the support shaft 140 via a through-hole (a second contacting portion) 162a. Then, in a state that the one end of the second base portion 162 has been positioned in the axial direction with respect to the support shaft 140, the second adjusting arm 134 is fixed in a freely revolving manner by the fastening bolt 152, along with the first adjusting arm 132.

As a result, a state is attained where the first and second adjusting arms 132, 134 are each supported in a freely revolving manner with respect to the support shaft 140 of the frame 130 in a state of being separated from each other in the axial direction (the up-down direction).

The contacting wall 164 is formed in a planar shape along an extension direction so as to be on an opposite side to the shift shaft portion 84 with respect to the second base portion 162 and face the holding wall 144 of the frame 130, and it becomes possible for the contacting wall 164 to be contacted by the tip 160a of the adjusting screw 160 that has been screwed into the first adjusting arm 132 and by a detecting portion 166 of the later-mentioned switch sensor 138.

The coil spring 136, which is a torsion spring wound around a plurality of times in a circumferential direction, and is inserted over an outer peripheral side of the support shaft 140 so as to be between the first adjusting arm 132 and the second adjusting arm 134, has its one end bent in substantially a U shape and engaged with the first rib 148 of the first adjusting arm 132, and its other end engaged with the contacting wall 164 of the second adjusting arm 134, for example.

Moreover, an elastic springing force of the coil spring 136 biases the first adjusting arm 132 clockwise (in an arrow C1 direction) about the support shaft 140 and biases the second adjusting arm 134 counterclockwise (in an arrow C2 direction) around the support shaft 140. That is, the first adjusting arm 132 and the second adjusting arm 134 are biased so as to rotate in contrary directions with the support shaft 140 as a fulcrum. Moreover, the elastic springing force of the coil spring 136 causes the adjusting screw 160 of the first adjusting arm 132 to always be in a state of abutting on the contacting wall 164 of the second adjusting arm 134.

Figure 4:
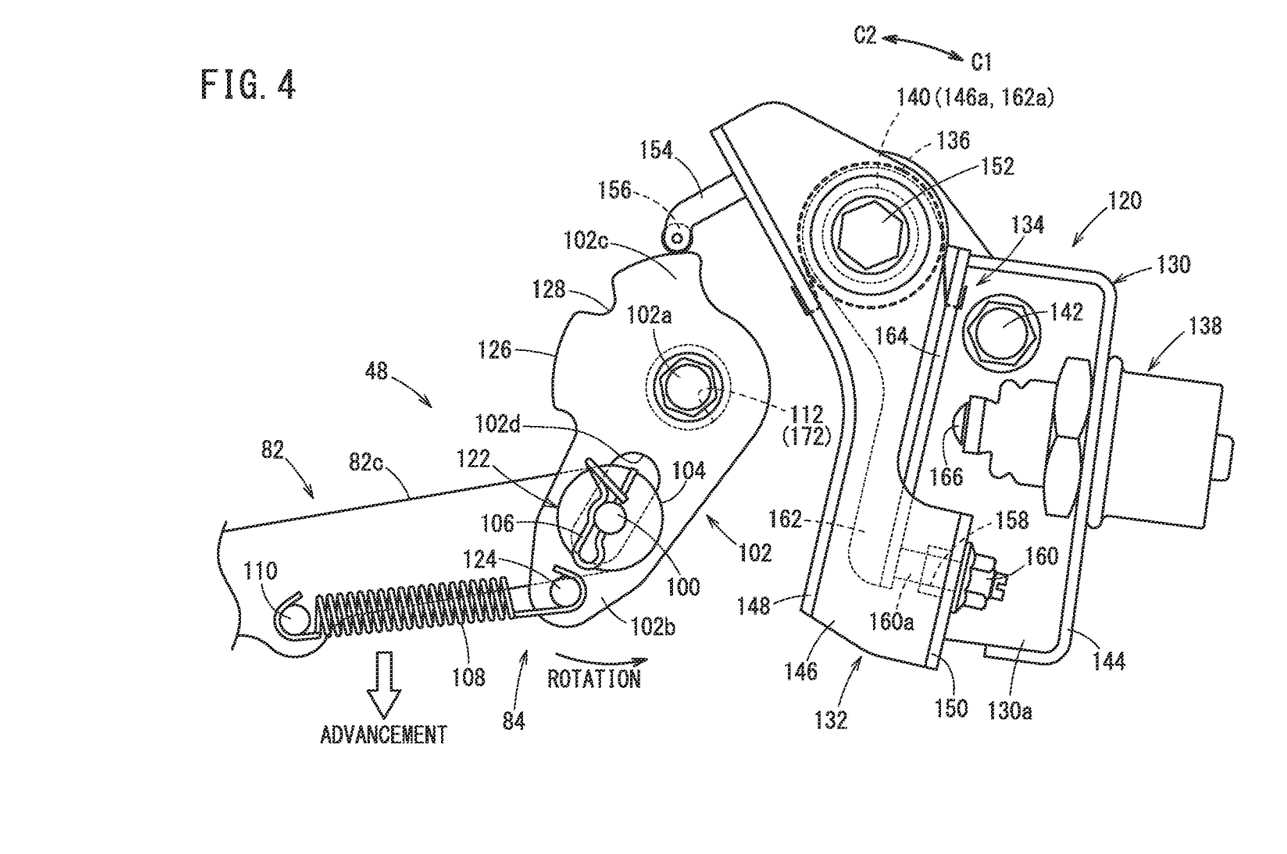
FIG. 4 is an explanatory drawing of operation of the neutral adjusting mechanism at a time of forward operation of the outboard motor shown in FIG. 3.
Figure 5:
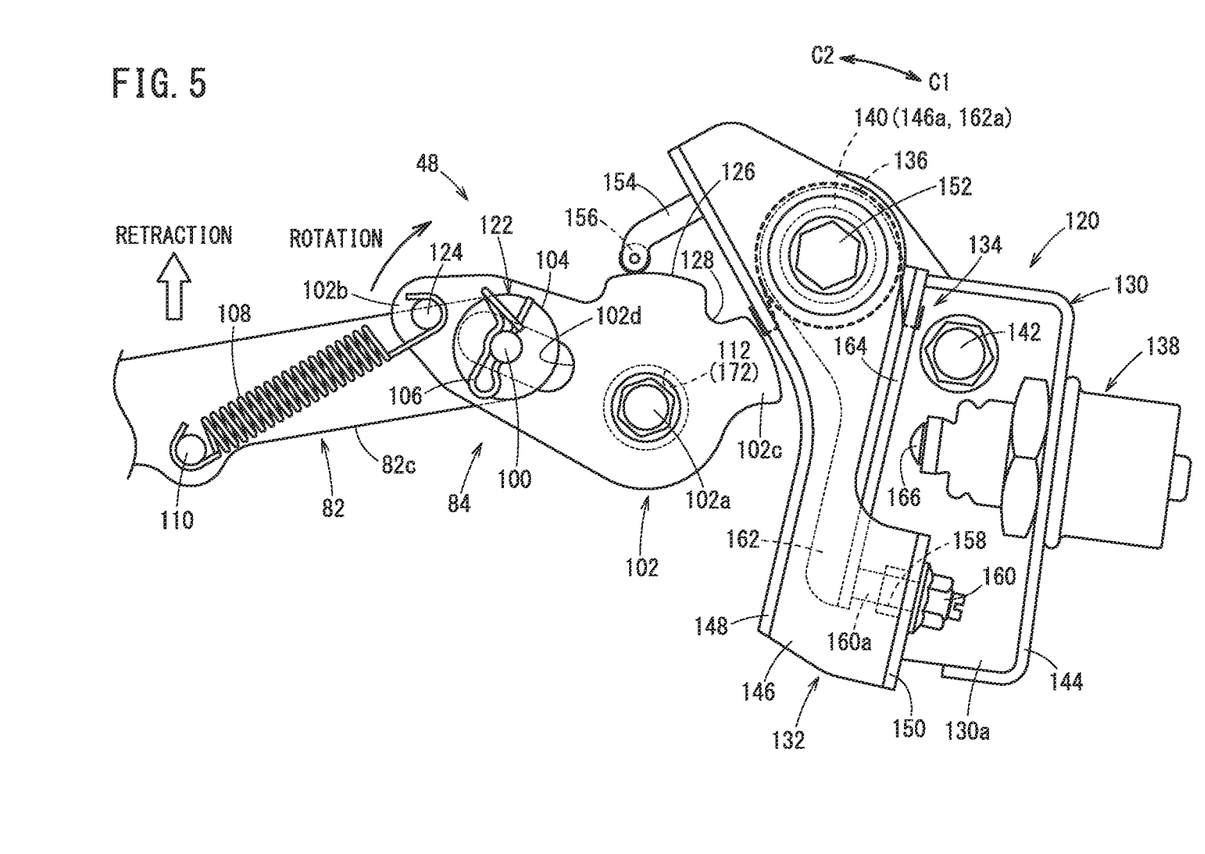
FIG. 5 is an explanatory drawing of operation of the neutral adjusting mechanism at a time of reverse operation of the outboard motor shown in FIG. 3.

The switch sensor 138, which is fixed to the holding wall 144 of the frame 130, is disposed so that the detecting portion 166 provided in its tip will be on a first and second adjusting arms 132, 134 side. Moreover, in the case that, as shown in FIGS. 4 and 5, the contactor 154 of the first adjusting arm 132 is on the outer edge 126 of the shift arm 102, the switch sensor 138 will be switched off due to the contacting wall 164 of the second adjusting arm 134 separating from the detecting portion 166. On the other hand, in the case that, as shown in FIGS. 2 and 3, the contactor 154 of the first adjusting arm 132 has entered the recess 128 of the shift arm 102, the switch sensor 138 will be switched on due to the contacting wall 164 of the second adjusting arm 134 contacting the detecting portion 166.

As a result, the switch sensor 138 outputs a detection signal to the control device 28 when the contactor 154 has entered the recess 128, and it is confirmed by said control device 28 that the shift mechanism 48 is in the neutral position. Then, the control device 28 implements various kinds of control based on the detected neutral position.

The outboard motor 10 comprising the neutral adjusting mechanism 120 according to the embodiment of the present invention, which is basically configured as above, will next have its operation and operational advantages described.

The unillustrated ship operator operates the operating unit (for example, a shift lever), whereby an operating signal thereof is received by the control device 28, and the actuator 74 is drive-controlled to rotate or stop rotation of the operating shaft 50.

In the case that, for example, the ship operator has put the shift lever into a forward-movement position from the neutral position, the movable rod 78 is moved forward under drive action of the actuator 74, and the sliding body 90 connected to the tip portion of said movable rod 78 is integrally displaced forwards. At this time, the shift pivot 96 is guided along the guide opening portion 88c of the guide body 88, and the link rod 82 coupled to the shift pivot 96 is displaced forwards along the guide opening portion 88c too.

Then, due to the displacement forwards of the link rod 82, the link pin 100 pushes the shift arm 102 round while moving in a tip direction within the link-dedicated hole portion 102d. This results in that, as shown in FIG. 4, the shift arm 102 rotates counterclockwise about the rotational center portion 102a, and the first shift shaft 112 and the first gear 114 shown in FIGS. 2 and 3 integrally rotate counterclockwise. Then, the second gear 116 meshing with the first gear 114 rotates clockwise, and the second shift shaft 118 and the operating shaft 50 rotate clockwise due to this rotation of the second gear 116.

Then, due to the operating shaft 50 rotating clockwise as mentioned above, the shift slider 52 of the transmission mechanism 24 advances, and the dog clutch 58 meshes with the forward-movement driven bevel gear 56a, whereby, due to rotation of said forward-movement driven bevel gear 56a, the propeller shaft 60 rotates in a direction moving the ship body Sh forwards.

Moreover, by the shift arm 102 rotating counterclockwise about the rotational center portion 102a, the contactor 154 is pushed out from the recess 128 of said shift arm 102, and the first adjusting arm 132 rotates clockwise (in the arrow C1 direction) against the elastic springing force of the coil spring 136, whereby said contactor 154 moves onto the outer edge 126. As a result, the second adjusting arm 134, along with the first adjusting arm 132 that configure the neutral adjusting mechanism 120 integrally rotate clockwise (in the arrow C1 direction), the contacting wall 164 separates from the detecting portion 166 of the switch sensor 138 switching it off, and it is confirmed by the control device 28 that the shift mechanism 48 is in a non-neutral position (the forward-movement position).

On the other hand, in the case that the unillustrated ship operator has put the shift lever into a reverse-movement position from the neutral position, the movable rod 78 is moved rearward under drive action of the actuator 74, the sliding body 90 (the shift pivot 96) retracts in a state of being guided along the guide opening portion 88c of the guide body 88, and, accordingly, the link rod 82 too moves rearwards along the guide opening portion 88c.

Then, due to displacement rearwards of the link rod 82, as shown in FIG. 5, the shift arm 102 of the shift shaft portion 84 rotates clockwise about the rotational center portion 102a. As a result, the first shift shaft 112 and the first gear 114 integrally rotate clockwise, the second gear 116 meshing with the first gear 114 shown in FIGS. 2 and 3 rotates counterclockwise, and the second shift shaft 118 and the operating shaft 50 rotate counterclockwise due to this rotation of the second gear 116.

Due to the operating shaft 50 rotating counterclockwise as mentioned above, the shift slider 52 of the transmission mechanism 24 retracts, and the dog clutch 58 meshes with the reverse-movement driven bevel gear 56b, whereby, due to rotation of said reverse-movement driven bevel gear 56b, the propeller shaft 60 rotates in a direction where the ship body Sh is reversed.

Moreover, by the shift arm 102 rotating counterclockwise about the rotational center portion 102a, the contactor 154 is pushed out from the recess 128 of said shift arm 102, and the first adjusting arm 132 rotates clockwise against the elastic springing force of the coil spring 136, whereby said contactor 154 moves onto the outer edge 126. As a result, the second adjusting arm 134, along with the first adjusting arm 132 that configure the neutral adjusting mechanism 120 integrally rotate clockwise (in the arrow C1 direction), the contacting wall 164 separates from the detecting portion 166 of the switch sensor 138 switching it off, and it is confirmed by the control device 28 that the shift mechanism 48 is in a non-neutral position (the reverse-movement position).

Next, the case where variation of the neutral position in the shift mechanism 48 is adjusted when the outboard motor 10 is manufactured at a factory, for example, will be described with reference to FIGS. 6A to 7B.

Figure 6A:
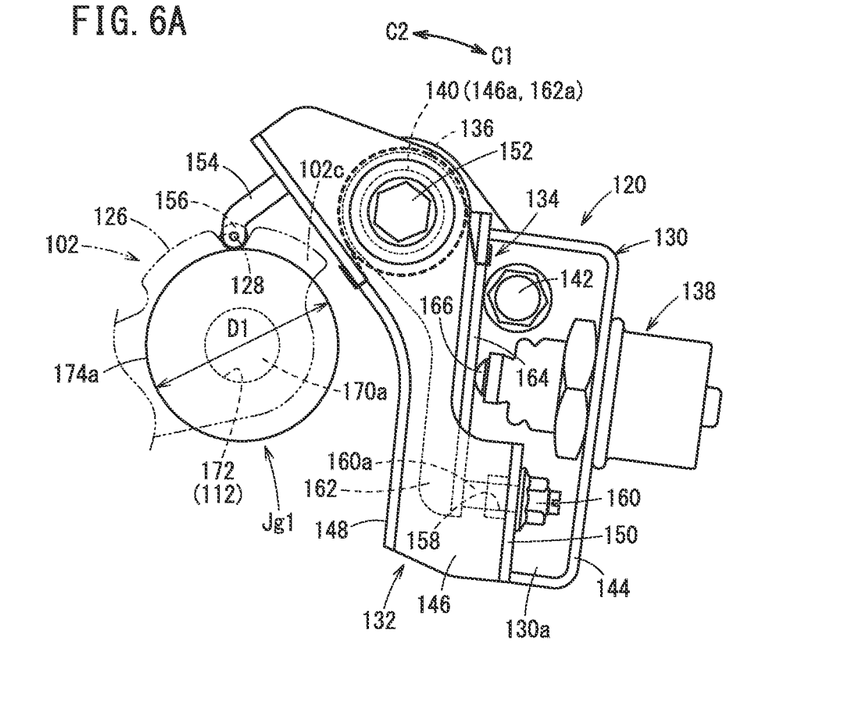
FIG. 6A is an explanatory drawing of the case where the neutral adjusting mechanism shown in FIG. 3 is adjusted to a neutral position using a first adjusting jig.
Figure 6B:
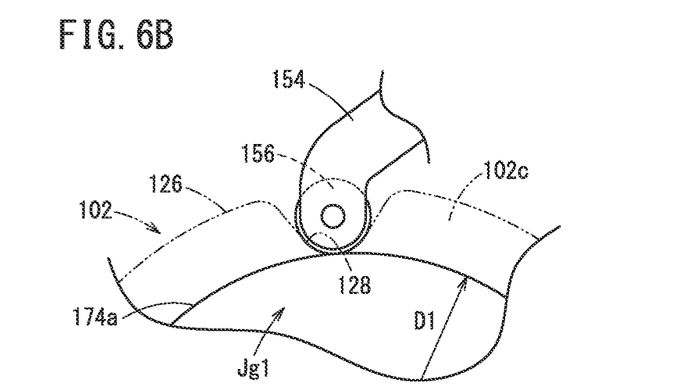
FIG. 6B is an enlarged plan view showing a vicinity of the first adjusting jig in FIG. 6A.
Figure 7A:
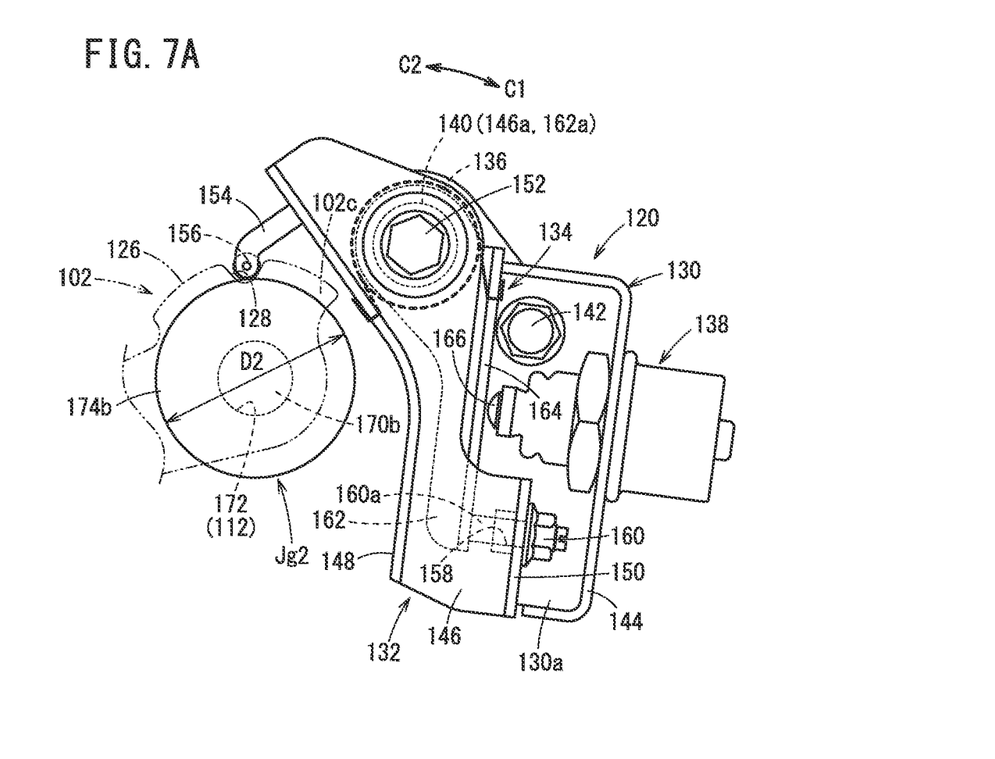
FIG. 7A is an explanatory drawing of the case where the neutral adjusting mechanism shown in FIG. 3 has its switching position adjusted from the neutral position to a non-neutral position using a second adjusting jig.
Figure 7B:
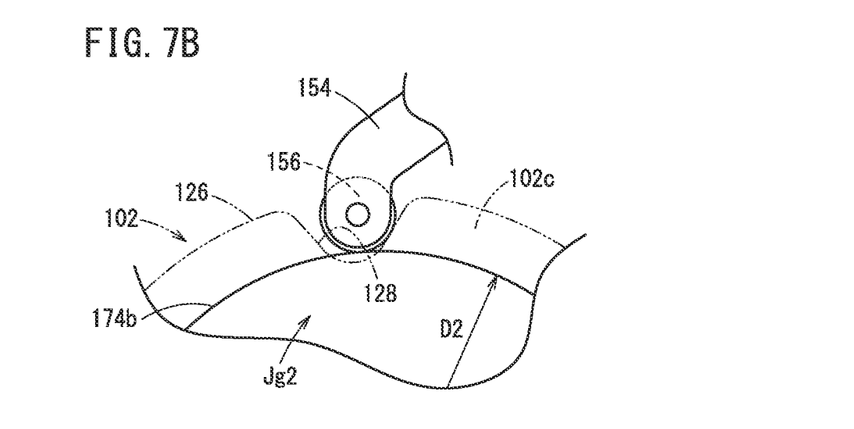
FIG. 7B is an enlarged plan view showing a vicinity of the second adjusting jig in FIG. 7A.

First, as shown in FIGS. 6A to 7B, a first adjusting jig (a first jig) Jg1 and a second adjusting jig (a second jig) Jg2 employed in this adjusting work, which are each formed in a shape of a tube formed with a constant diameter in an axial direction, respectively have on their one ends in the axial direction tip shaft portions 170a, 170b that are formed with substantially the same diameter as the first shift shaft 112 (a shaft hole 172) of the shift shaft portion 84. An outer peripheral diameter D1 of the first adjusting jig Jg1 is formed with a diameter inside a range of the neutral position in the recess 128 of the shift arm 102, as shown in FIGS. 6A and 6B, and an outer peripheral diameter D2 of the second adjusting jig Jg2 is formed with a diameter slightly larger than the outer peripheral diameter D1 of the first adjusting jig Jg1, outside a range of the neutral position (at a non-neutral position) in the recess 128 of the shift arm 102, as shown in FIGS. 7A and 7B (D2>D1).

Moreover, in the case of adjustment of the neutral position being performed using the above-mentioned first adjusting jig Jg1, as shown in FIG. 6A, the shaft hole 172 prior to being fitted with the first shift shaft 112 has the tip shaft portion 170*a* of the first adjusting jig Jg1 inserted therein from above. As a result, the first adjusting jig Jg1 is disposed coaxially to the shaft hole 172 (the first shift shaft 112) and the shift arm 102 in the planar view of the neutral adjusting mechanism 120 shown in FIG. 6A.

Next, the contactor 154 of the first adjusting arm 132 is set in a state of having been contacted on an outer peripheral surface 174*a* of the first adjusting jig Jg1, the adjusting screw 160 is spirally turned by an unillustrated operator to be advanced/retracted in an axial direction, and the second adjusting arm 134 is rotated with respect to the first adjusting arm 132 with the support shaft 140 as a fulcrum, whereby the contacting wall 164 is contacted on the detecting portion 166 of the switch sensor 138.

Specifically, by the adjusting screw 160 being spirally turned and advanced to a side of the contacting wall 164 of the second adjusting arm 134, the contacting wall 164 that has been pressed by the tip 160*a* of said adjusting screw 160 revolves in a direction of separating from the second rib 150 of the first arm 132 (clockwise, in the arrow C1 direction) against the elastic springing force of the coil spring 136.

On the other hand, by the adjusting screw 160 being spirally turned in an opposite direction to that described above and retracted in a direction of separating from the contacting wall 164, the contacting wall 164 is caused by the elastic springing force of the coil spring 136 to revolve in a direction of approaching the second rib 150 (counterclockwise, in the arrow C2 direction). That is, by the adjusting screw 160 being advanced/retracted in the axial direction, relative positions in a rotational direction of the first adjusting arm 132 and the second adjusting arm 134 about the support shaft 140 can be freely changed (adjusted).

Thus, by the contacting wall 164 of the second adjusting arm 134 being contacted on the detecting portion 166 of the switch sensor 138 under spiral turning action of the adjusting screw 160 in a state that the contactor 154 has been contacted on the outer peripheral surface 174*a* of the first adjusting jig Jg1 formed with a diameter inside the range of the neutral position in the recess 128 shown in FIG. 6A, there results a state that the shift mechanism 48 has been adjusted inside the range of the neutral position.

Next, adjustment of a switching position from the neutral position of the shift mechanism 48 to a non-neutral position (outside the range of the neutral position) is performed using the second adjusting jig Jg2.

In this adjusting work, as shown in FIG. 7A, the above-mentioned first adjusting jig Jg1 is removed, and the shaft hole 172 prior to being fitted with the first shift shaft 112 has the tip shaft portion 170*b* of the second adjusting jig Jg2 inserted therein from above. As a result, the second adjusting jig Jg2 is disposed coaxially to the shaft hole 172 (the first shift shaft 112) and the shift arm 102 in the planar view of the neutral adjusting mechanism 120 shown in FIG. 7A.

Then, after the contactor 154 of the first adjusting arm 132 has been set in a state of having been contacted on an outer peripheral surface 174*b* of the second adjusting jig Jg2, the adjusting screw 160 is spirally turned by the unillustrated operator and advanced/retracted to the contacting wall 164 side, whereby the second adjusting arm 134 is revolved clockwise (in the arrow C1 direction) with respect to the first adjusting arm 132 against the elastic springing force of the coil spring 136, and the contacting wall 164 is separated from the detecting portion 166 of the switch sensor 138.

Thus, by the contacting wall 164 of the second adjusting arm 134 being separated from the detecting portion 166 of the switch sensor 138 under spiral turning action of the adjusting screw 160 in a state that the contactor 154 has been contacted on the outer peripheral surface 174*b* of the second adjusting jig Jg2 formed with a diameter outside the range of the neutral position in the recess 128 shown in FIG. 7A, there results a state that the shift mechanism 48 has been adjusted to be outside the range of the neutral position (at a non-neutral position). That is, by switching a contact state of the contacting wall 164 on the detecting portion 166 of the switch sensor 138 using the first and second adjusting jigs Jg1, Jg2, it becomes possible for the switching position (a switching timing) of the neutral position and the non-neutral position to be easily and certainly adjusted in a state of the contactor 154 having entered the recess 128.

Finally, by the second adjusting jig Jg2 used in the above-described adjustment being removed from the shaft hole 172 and the first shift shaft 112 being inserted through said shaft hole 172, and by the shift arm 102 being coupled to the upper end portion of the first shift shaft 112 so that the contactor 154 is fitted contacting the recess 128 or the outer edge 126, assembly of the shift mechanism 48 that has undergone variation adjustment of the neutral position, is completed.

Next, in the case of the neutral position in the shift mechanism 48 being adjusted at a time of maintenance of the outboard motor 10, adjustment is performed such that the adjusting screw 160 is spirally turned by the unillustrated operator, whereby in the neutral position of the contactor 154 having entered the recess 128 of the shift arm 102, for example, the second adjusting arm 134 is revolved about the support shaft 140, and the contacting wall 164 contacts the detecting portion 166 of the switch sensor 138. Moreover, adjustment is performed such that in the non-neutral position of the contactor 154 having contacted the outer edge 126 of the shift arm 102, the adjusting screw 160 is spirally turned so that the second adjusting arm 134 is revolved about the support shaft 140, and the contacting wall 164 separates from the detecting portion 166 of the switch sensor 138 to never contact it.

Figure 8:
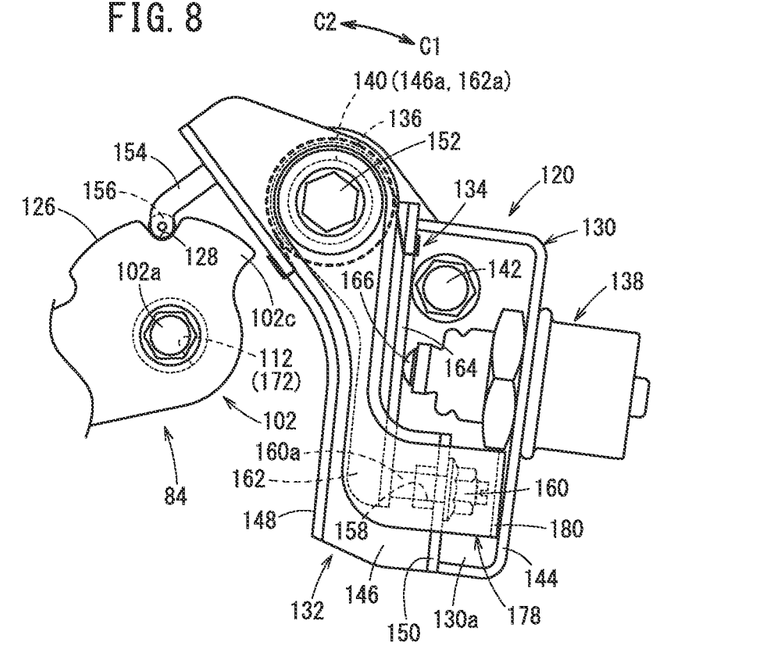
FIG. 8 is an enlarged plan view showing a state where the neutral adjusting mechanism of FIG. 3 has been mounted with a protective cover.

Moreover, a protective cover 178 of the kind shown in FIG. 8 may be provided with a purpose of preventing the adjusting screw 160 from ending up being spirally turned due to unintentional contact, in a state where variation adjustment of the neutral position of the shift mechanism 48 has been made by the neutral adjusting mechanism 120.

This protective cover 178, which is provided above the first adjusting arm 132 and has its one end side fixed to the support shaft 140 by the fastening bolt 152, has on its other end a cover portion 180 which is bent toward a bottom wall 130*a* side of the frame 130 so as to cover the adjusting screw 160 and part of the second rib 150, for example. Moreover, due to the end portion of the adjusting screw 160 being covered by this cover portion 180, unintentional contact on the adjusting screw 160 is avoided, a positional relationship in the rotational direction of the first adjusting arm 132 and the second adjusting arm 134 that have undergone adjustment by said adjusting screw 160 is maintained, and certainly maintained in a state where variation of the neutral position has been adjusted.

As indicated above, in the present embodiment, the shift mechanism 48 configuring the outboard motor 10 comprises the movable rod 78 that freely moves in the axial direction under drive action of the electric actuator 74, and has the shift shaft portion 84 that switches to neutral, forward, and reverse due to movement of said movable rod 78, wherein the neutral adjusting mechanism 120 capable of adjusting the neutral position of the shift mechanism 48 is provided as a separate body so as to face the shift arm 102 of the shift shaft portion 84.

Moreover, the neutral adjusting mechanism 120 has the first and second adjusting arms 132, 134 that are provided in a freely rotating manner to the frame 130 via the support shaft 140, wherein the first adjusting arm 132 comprises the adjusting screw 160 which abuts on the second adjusting arm 134 and freely advances/retracts by being spirally turned with respect to the second rib 150, while the second adjusting arm 134 comprises the contacting wall 164 which is capable of contacting the switch sensor 138 for detecting the neutral position and which is capable of being contacted by the tip 160a of the adjusting screw 160.

It hence becomes possible to make adjustment in a manner that, by spirally turning the adjusting screw 160 to adjust the relative positions of the first adjusting arm 132 and the second adjusting arm 134 in the rotational direction with the support shaft 140 as a fulcrum, the contacting wall 164 of the second adjusting arm 134 contacts the detecting portion 166 of a switch arm in a state of the contactor 154 of the first adjusting arm 132 having entered the recess 128 of the shift arm 102.

As a result, it becomes possible for the neutral position of the shift mechanism 48 in the outboard motor 10 to be easily and certainly adjusted by spirally turning the adjusting screw 160, and, moreover, due to the neutral adjusting mechanism 120 being configured as a separate body from the shift mechanism 48, it can be easily retrofitted to an outboard motor 10 not comprising the neutral adjusting mechanism 120, for example. It therefore becomes possible for the neutral adjusting mechanism 120 to be applied also to an outboard motor 10 having a cable system shift mechanism other than the above-mentioned kind of electronically controlled shift mechanism 48 comprising the actuator 74.

Moreover, since the neutral adjusting mechanism 120 comprises the coil spring 136 that biases the second adjusting arm 134 in a contrary direction to the first adjusting arm 132, it becomes possible to configure a state where the adjusting screw 160 of the first adjusting arm 132 and the contacting wall 164 of the second adjusting arm 134 are always abutting on each other. It therefore becomes possible for the positional relationship in the rotational direction of the first adjusting arm 132 and the second adjusting arm 134 to be easily and freely adjusted by spirally turning the adjusting screw 160.

Furthermore, in the neutral adjusting mechanism 120, the first and second adjusting arms 132, 134 are jointed in a freely rotating state with respect to the support shaft 140 provided in the frame 130, hence by contacting the contactor 154 of one of the adjusting arms, that is, the first adjusting arm 132 on the shift arm 102, and disposing the other of the adjusting arms, that is, the second adjusting arm 134 so as to be able to contact the switch sensor 138 and the adjusting screw 160, it becomes possible for variation in the neutral position to be adjusted by relatively rotating the first adjusting arm 132 and the second adjusting arm 134 about the support shaft 140.

Further still, when the outboard motor 10 is manufactured in a factory, the first adjusting jig Jg1 having the outer peripheral surface 174a of the same diameter as the innermost peripheral diameter of the recess 128 in the shift arm 102, and the second adjusting jig Jg2 having the outer peripheral surface 174b of a diameter larger than that of the outer peripheral surface 174a of said first adjusting jig Jg1, are employed, and adjustment can be made such that the detecting portion 166 of the switch sensor 138 is contacted in a state of the contactor 154 of the neutral adjusting mechanism 120 having been contacted on said outer peripheral surfaces 174. As a result, variation in the neutral position of the shift mechanism 48 can be easily and certainly adjusted to achieve a reduction in assembly work when the outboard motor 10 is manufactured.

Figure 9A:
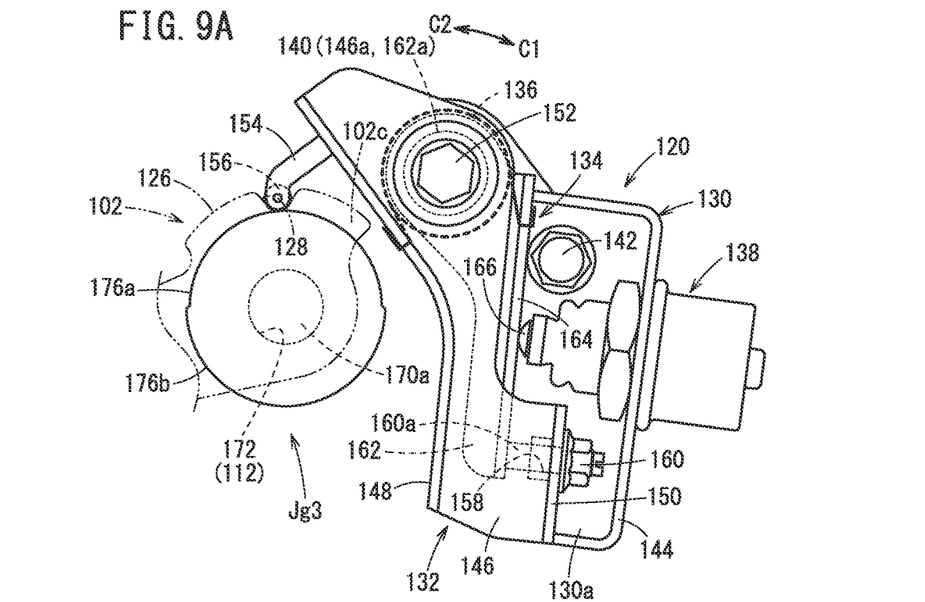
FIG. 9A is an explanatory drawing of the case where a neutral adjusting mechanism is adjusted to a neutral position by a first outer diameter portion of a third adjusting jig.
Figure 9B:
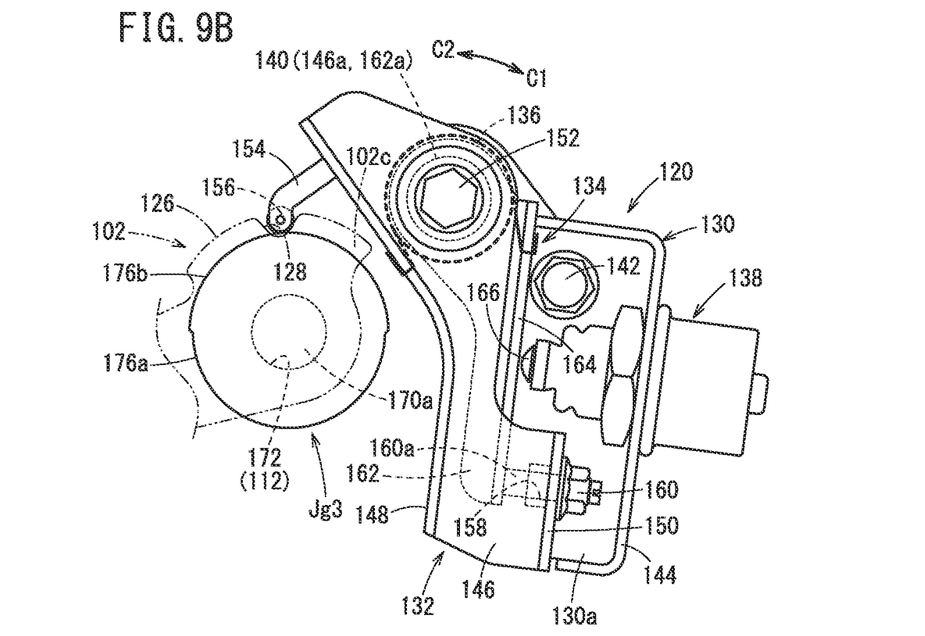
FIG. 9B is an explanatory drawing of the case where a switching position is adjusted from the neutral position to a non-neutral position by a second outer diameter portion of the third adjusting jig.

Yet further, when the outboard motor 10 is manufactured in a factory or undergoes maintenance, adjustment of variation in the neutral position is not limited to the case of being performed using the above-mentioned two adjusting jigs, that is, the first adjusting jig Jg1 and the second adjusting jig Jg2, and, as shown in FIGS. 9A and 9B, for example, there may be adopted a configuration such that the adjustment is performed using a single third adjusting jig (a jig) Jg3 having a first outer diameter portion 176a corresponding to inside the range of the neutral position of the recess 128 in the shift arm 102 and a second outer diameter portion 176b corresponding to outside the range of the neutral position (a non-neutral position) of the recess 128 in the shift arm 102. This first outer diameter portion 176a is formed with the same outer peripheral diameter D1 as the first adjusting jig Jg1, and this second outer diameter portion 176b is formed with the same outer peripheral diameter D2 as the second adjusting jig Jg2.

In this case, as shown in FIG. 9A, the contacting wall 164 of the second adjusting arm 134 is adjusted so as to contact the detecting portion 166 of the switch sensor 138 in a state where the contactor 154 of the neutral adjusting mechanism 120 has been contacted on the first outer diameter portion 176a of the third adjusting jig Jg3 corresponding to the neutral position of the recess 128 in the shift arm 102, and, as shown in FIG. 9B, the contacting wall 164 is adjusted so as to be non-contacting with the detecting portion 166 in a state where the contactor 154 has been contacted on the second outer diameter portion 176b corresponding to the non-neutral position in the recess 128. This makes it possible for the neutral position and the non-neutral position (the forward-movement position and the reverse-movement position) in the shift mechanism 48 to be simultaneously adjusted by the third adjusting jig Jg3, whereby manufacturing or maintenance of the outboard motor 10 is efficiently performed.

Moreover, by the neutral adjusting mechanism 120 being provided with the protective cover 178 to prevent contact on the adjusting screw 160, the unillustrated operator is prevented from unintentionally ending up contacting the adjusting screw 160, hence the neutral position of the shift mechanism 48 that has undergone adjustment by the adjusting screw 160 is certainly maintained.

Note that the neutral adjusting mechanism of the outboard motor according to the present invention is not limited to the above-mentioned embodiment, and it goes without saying that a variety of configurations may be adopted therefor without departing from the spirit of the present invention.

What is claimed is:

1. A neutral adjusting mechanism of an outboard motor, the neutral adjusting mechanism comprising:
   a shift mechanism having an electric actuator and a switching means, the electric actuator linearly moving a movable portion, and the switching means switching from neutral to forward or reverse based on displacement of said movable portion; and
   a position adjusting mechanism enabling a neutral position of the shift mechanism to be adjusted,
   the shift mechanism and the position adjusting mechanism being configured by separate bodies.

2. The neutral adjusting mechanism of an outboard motor according to claim 1, wherein
   the position adjusting mechanism comprises a first arm and a second arm that are capable of rotating relatively to each other,
   the first arm has: an engaging portion which is engaged with a shift shaft in the neutral position of the shift mechanism; and a first connecting portion which is connected to the second arm,
   the second arm has: a switching portion which switches an ON/OFF state of a switch detecting that the shift mechanism is in the neutral position; and a second connecting portion which is connected to the first arm, and
   the neutral adjusting mechanism comprises: a position adjusting portion which is provided in the first arm and the second arm, and by which the neutral position is adjusted; and an elastic member by which the position adjusting portion of the first arm and the position adjusting portion of the second arm are biased in a direction of approaching each other.

3. The neutral adjusting mechanism of an outboard motor according to claim 2, wherein
   the position adjusting portion is configured from: an adjusting screw which is provided in either one arm of the first arm and the second arm, and which advances/retracts under spiral turning action; and a contacting portion which is provided in the other of the arms not provided with said adjusting screw, and which is capable of being contacted by an end portion of said adjusting screw.

4. The neutral adjusting mechanism of an outboard motor according to claim 2, wherein
   the elastic member is a torsion spring which is installed in at least either one of the first arm and the second arm, and which applies rotational forces in contrary directions to each other.

5. The neutral adjusting mechanism of an outboard motor according to claim 2, wherein
   the first and second connecting portions are through-holes which are provided parallelly to the shift shaft and which are coaxially formed, and the first connecting portion and the second connecting portion are coupled via a support shaft inserted through said through-holes.

6. The neutral adjusting mechanism of an outboard motor according to claim 2, wherein
   the shift shaft has an engaging recess which is of smaller diameter than an outer peripheral surface of said shift shaft and which is engaged by the engaging portion in the neutral position, and, when the position adjusting mechanism is assembled, the engaging portion abuts on each of an outer peripheral surface of a first jig formed with an outer peripheral diameter inside a range of the neutral position within the engaging recess, and an outer peripheral surface of a second jig formed with an outer peripheral diameter outside the range of the neutral position within the engaging recess.

7. The neutral adjusting mechanism of an outboard motor according to claim 2, wherein
   the shift shaft has an engaging recess which is of smaller diameter than an outer peripheral surface of said shift shaft and which is engaged by the engaging portion in the neutral position, and, when the position adjusting mechanism is assembled, the engaging portion abuts on a jig having a first outer peripheral portion formed with an outer peripheral diameter inside a range of the neutral position within the engaging recess, and a second outer peripheral portion of larger diameter than said first outer peripheral portion and formed with an outer peripheral diameter outside the range of the neutral position within the engaging recess.

8. The neutral adjusting mechanism of an outboard motor according to claim 2, wherein
   the position adjusting portion comprises a protective cover covering at least part of said position adjusting portion.

* * * * *